US006973834B1

(12) United States Patent
Golan

(10) Patent No.: US 6,973,834 B1
(45) Date of Patent: Dec. 13, 2005

(54) METHOD AND APPARATUS FOR MEASURING PRESSURE OF A FLUID MEDIUM AND APPLICATIONS THEREOF

(75) Inventor: Gady Golan, Hod Hasharon (IL)

(73) Assignee: A.T.C.T. Advanced Thermal Chips Technologies Ltd., Tel-Aviv (IL)

( * ) Notice: Subject to any disclaimer, the term of this patent is extended or adjusted under 35 U.S.C. 154(b) by 0 days.

(21) Appl. No.: 10/965,790

(22) Filed: Oct. 18, 2004

(51) Int. Cl.[7] .................................................. G01L 9/00
(52) U.S. Cl. ............................. 73/753; 73/700; 73/754
(58) Field of Search ................................... 73/700–754

(56) References Cited

U.S. PATENT DOCUMENTS

| | | | |
|---|---|---|---|
| 4,521,373 A * | 6/1985 | Terhune et al. | 73/295 |
| 6,536,273 B2 * | 3/2003 | Schrittenlacher | 73/204.11 |
| 6,901,808 B1 * | 6/2005 | Sharpless et al. | 73/724 |
| 2004/0056321 A1 * | 3/2004 | Parsons | 257/417 |
| 2004/0177966 A1 * | 9/2004 | Vinegar et al. | 166/302 |

* cited by examiner

*Primary Examiner*—William Oen
*Assistant Examiner*—Alandra Ellington

(57) ABSTRACT

Method and apparatus for measuring the pressure of a fluid medium, by immersing within the fluid medium an electrical resistor having a resistance varying with temperature; applying electrical current through the electrical resistor to heat it to a predetermined temperature above that of the fluid medium; and measuring the rate of change in resistance of the electrical resistor to produce a measurement of the rate of thermal heat dissipation, varying with the density of the fluid medium in which the electrical resistor is immersed, and thereby a measurement of the pressure of the fluid medium. The electrical resistor is a positive temperature coefficient thermistor driven by a constant voltage source and having a resistance which increases sharply at the predetermined temperature, such that the thermistor is automatically self-controlled to substantially maintain the predetermined temperature, whereby the electrical current drawn by the thermistor is a measurement of the thermal load on the thermistor resulting from the thermal heat dissipation therefrom, and thereby a measurement of the pressure of the fluid medium. Many applications of such method and apparatus are described, including a vacuum gauge, a pressure gauge, a barometer, a Pitot tube type speedometer, and a helicopter blade leak detector.

20 Claims, 4 Drawing Sheets

METHOD AND APPARATUS FOR MEASURING PRESSURE OF A FLUID MEDIUM AND APPLICATIONS THEREOF

FIELD AND BACKGROUND OF THE INVENTION

The present invention relates to methods and apparatus for measuring the pressure of a fluid medium capable of use in a wide variety of applications. The invention is particularly useful as a vacuum gauge, pressure gauge, barometer, altimeter, Pitot tube speedometer, and helicopter blade leak detector; and the invention is therefore described below with respect to such applications.

The measurement of fluid medium pressure is utilized in many diverse applications, and many different types of pressure measuring devices have been developed for each particular application. One class of pressure measuring devices, particularly used in vacuum systems, is based on the measurement of changes in thermal conductivity accompanying changes in pressure, and thereby changes in density, of the gas. Thus, in a thermal conductivity gauge, the pressure depends on the heat conduction through the gas from a hot spot of a self-regulated source to the surrounding glass or metal envelope at room temperature. A popular example of a thermal conductivity gauge is the Pirani Gauge, in which the hot spot is produced by driving current through a tungsten filament having a linear temperature coefficient of resistance. However, such gauges require temperatures of over 1,000° C., and generally are of large dimensions, cumbersome and of high cost. Also, if this gauge is accidentally exposed to atmospheric environment, the filament is immediately burnt up due to its high temperature.

Moreover, the accuracy and reproducibility of the measurements in a vacuum system are generally just as important as the production of the vacuum. The known thermal conductivity gauges in general, and specifically the Pirani Gauge, are generally characterized by reproducibility or error which, at best, is about 5%. Moreover, because of the extremely large range of pressures that may be involved in a vacuum system, from atmospheric down to $10^{-12}$ bar or less, there is no single vacuum gauge which covers the whole range.

The foregoing drawbacks in thermal conductivity gauges in general, and in the Pirani Gauge in particular, are also applicable in other fluid medium pressure measuring devices, such as in barometers for measuring barometric pressure, altimeters, etc.

OBJECTS AND BRIEF SUMMARY OF THE PRESENT INVENTION

An object of the present invention is to provide a method and apparatus for measuring fluid medium pressure having advantages in one or more of the above respects.

Another object of the present invention is to provide a fluid medium pressure measuring method and apparatus capable of being used in a wide variety of applications involving a wide range of pressure measurements.

According to one aspect of the present invention, there is provided a method of measuring the pressure of a fluid medium, comprising: immersing within the fluid medium an electrical resistor having a resistance varying with temperature; applying electrical current through the electrical resistor to heat it to a predetermined temperature above that of the fluid medium; and measuring the rate of change in resistance of the electrical resistor to produce a measurement of the rate of thermal heat dissipation, varying with the density of the fluid medium in which the electrical resistor is immersed, and thereby a measurement of the pressure of the fluid medium; wherein the electrical resistor is a positive temperature coefficient thermistor driven by a constant voltage source and having a resistance which increases sharply at the predetermined temperature, such that the thermistor is automatically self-controlled to substantially maintain the predetermined temperature, whereby the electrical current drawn by the thermistor is a measurement of the thermal load on the thermistor resulting from the thermal heat dissipation therefrom, and thereby a measurement of the pressure of the fluid medium.

Positive temperature coefficient (PTC) thermistors can be constructed by known doping and sintering processes to have a maximum predetermined temperature irrespective of the power supplied to the thermistor. The use of PTC thermistors for measuring pressure in accordance with the present invention thereby obviates the need for additional controls or other temperature sensors. Many other important advantages in the use of such thermistors for pressure measurement are described below.

In this respect, references is made to U.S. Pat. No. 6,509,553, assigned to the same assignee as the present application, disclosing the use of positive temperature coefficient thermistors for providing an indication of the composition of a fluid medium in which the thermistor is immersed. Reference is also made to U.S. patent application Ser. No. 10/344,134, filed Aug. 16, 2001, also assigned to the same assignee as the present application, disclosing the use of positive temperature coefficient thermistors for efficiently evaporating liquids, such as for the removal of water condensation in air conditioning systems. Further, reference is made to U.S. patent application Ser. No. 10/844,397 filed May 13, 2004, disclosing the use of positive temperature coefficient thermistors for measuring flow velocity, including measuring heat flow, wind velocity, and wind direction. The present invention relates to yet additional applications of PTC thermistors involving the measurement of fluid medium pressure.

For purposes of example, a number of embodiments of the invention are described below including embodiments: wherein the positive temperature coefficient thermistor is immersed in a vacuum such that the produced measurement is the level of the vacuum; wherein the positive temperature coefficient thermistor is immersed in a pressurized fluid medium such that the produced measurement is the pressure of the fluid medium; and wherein the positive temperature coefficient thermistor is exposed to the atmosphere such that the produced measurement is the barometric pressure, or the altitude of a body carrying the positive temperature coefficient thermistor.

A further embodiment is described wherein the positive temperature coefficient thermistor is included in a pitot tube carried by a body moving through the fluid medium such that the produced measurement is the velocity of movement of the body through the fluid medium.

A still further embodiment is described wherein the positive temperature coefficient thermistor is included in a compartment initially filled with a gas of known pressure in order to detect leakage of the gas from the compartment. In the described preferred embodiment, the compartment is within a helicopter blade in order to detect formation of a crack in the helicopter blade.

According to another aspect of the present invention, there is provided apparatus for measuring the pressure of a fluid medium, comprising: an electrical resistor having a resistance varying with temperature to be immersed in the fluid medium; a power supply for supplying said electrical resistor with electrical current to heat it to a predetermined temperature above that of the fluid medium; and a processor for measuring the change in resistance of said electrical resistor to produce a measurement of the rate of thermal heat dissipation of the fluid medium in which the electrical resistor is immersed, and thereby a measurement of the pressure of said fluid medium; wherein said electrical resistor is a positive temperature coefficient thermistor driven by a constant voltage from said power supply and having a resistance which increases sharply at said predetermined temperature at which it is maintained by said constant voltage, such that the thermistor is automatically self-controlled to substantially maintain said predetermined temperature; and wherein said processor utilizes the measured changes in resistance of said positive temperature coefficient thermistor to produce a measurement of the pressure of said fluid medium.

In all the preferred embodiments described below, the positive temperature coefficient thermistor is preferably a barium titanate thermistor.

As will be described more particularly below, such method and apparatus can be implemented in relatively simple, inexpensive and efficient systems for making various measurements involving the measurement of fluid medium pressure as briefly mentioned above. Particular advantages of the invention, especially when implemented in those applications as to be described more particularly below, are that the apparatus requires substantially no moving parts, substantially no maintenance, has a virtually infinite lifetime, and/or may be used in applications involving a wide range of pressure measurements.

Further features and advantages of the invention will be apparent from the description below.

BRIEF DESCRIPTION OF THE DRAWINGS

The invention is herein described, by way of example only, with reference to the accompanying drawings, wherein.

It is to be understood that the foregoing drawings, and the description below, are provided primarily for purposes of facilitating understanding the conceptual aspects of the invention and various possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

DESCRIPTION OF PREFERRED EMBODIMENTS

Figure 1:
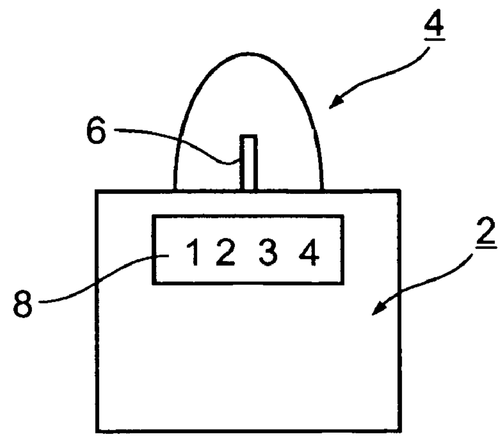
FIG. 1 illustrates on form of vacuum gauge constructed in accordance with the present invention.
Figure 2:
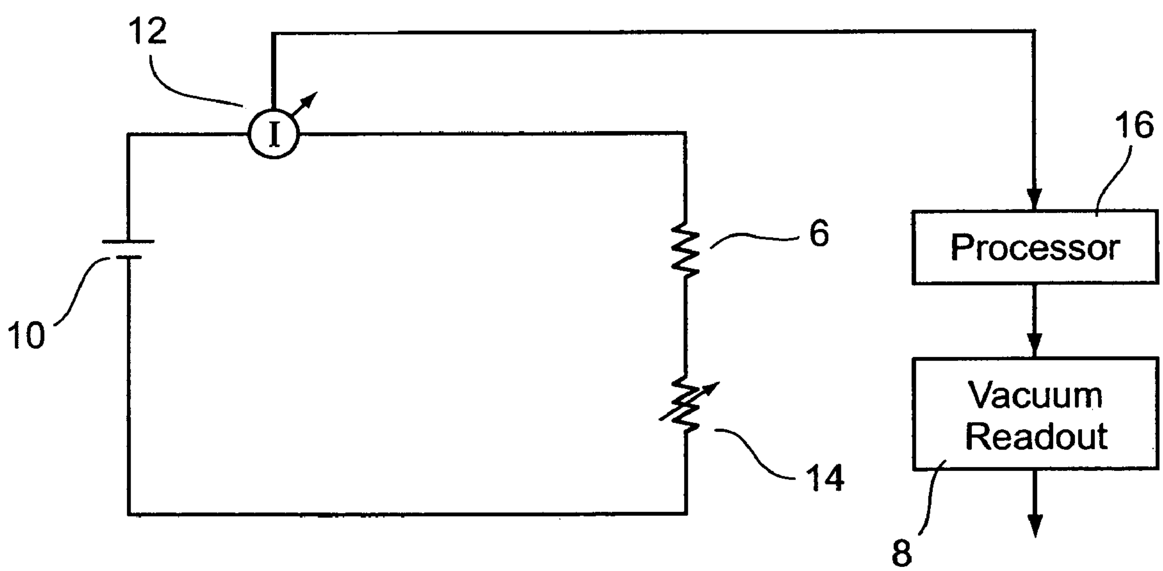
FIG. 2 is a circuit diagram illustrating the circuit in the vacuum gauge of FIG. 1.

FIG. 1 illustrates a vacuum gauge constructed in accordance with the present invention for measuring the level of vacuum within a vacuum chamber VC; and FIG. 2 is a schematical diagram illustrating the electrical system included in the vacuum gauge of FIG. 1.

The illustrated vacuum gauge includes a vacuum pump, generally designated 2, of a known construction, such as a roughing pump or a diffusion pump, for producing a vacuum within the vacuum chamber VC defined by a cover 4. As will be described more particularly below with respect to FIG. 2, the vacuum chamber VC includes a positive temperature coefficient (PTC) thermistor 6 for measuring the level of the vacuum within the vacuum chamber, and a digital display 8 for reading out the measured vacuum level.

The electrical circuit included within the vacuum gauge of FIG. 1 is more particularly illustrated in FIG. 2. It includes, besides PTC thermistor 6: a voltage source 10 for supplying the PTC thermistor with electrical current to heat it to a predetermined temperature; a current meter 12 which measures the current supplied to the PTC thermistor; and a calibration resistor 14 for calibrating the PTC thermistor. The electrical circuit further includes a processor 16 which receives the output of current meter 12 and processes such output to produce a measurement of the vacuum within vacuum chamber VC, as will be described more particularly below.

The vacuum gauge illustrated in FIGS. 1 and 2 is a thermal conductivity gauge, in which the PTC thermistor 6 acts as an electrical resistor to produce a hot spot, and in which the rate of thermal heat dissipation therefrom is measured. Such rate varies with the density of the ambient air within vacuum chamber VC, and thereby provides a measurement of the pressure of the gas within the vacuum chamber. Thus, the thermal conductivity of gases varies with the gas density in a known or predetermined manner so that by measuring the rate of heat dissipation of the hot spot produced by the PTC thermistor 6, one can correlate the heat dissipation rate to the pressure within the vacuum chamber.

In the conventional Pirani type of thermal conductivity gauge, the current is driven through a tungsten filament, which has a linear temperature coefficient of resistance. Therefore, such a gauge requires regulation, and accordingly is of generally large dimensions, cumbersome to use, characterized by high costs, and easily burned out in case of a vacuum leak.

According to the present invention, the electrical resistor producing the hot spot is the PTC thermistor 6 which is driven by a constant voltage source 10. Such a thermistor has a resistance which increases sharply at a predetermined temperature to which the vacuum chamber VC is heated, such that the thermistor is automatically self-controlled to substantially maintain that predetermined temperature. Accordingly, the electrical current drawn by PTC thermistor 6 is a measurement of the thermal load on the thermistor resulting from the thermal heat dissipation therefrom, and thereby is a measurement of the pressure of the fluid medium within vacuum chamber VC.

A vacuum gauge constructed as described above with respect to FIGS. 1 and 2 therefore enables the hot spot temperature to be substantially lower than in a conventional Pirani Gauge. Moreover, such a vacuum gauge would not burn up even in case of a vacuum leak. Further, because of its simplicity of construction, such a vacuum gauge can be implemented in a very compact structure of relatively low cost and of virtually indefinite lifetime.

Figure 3:
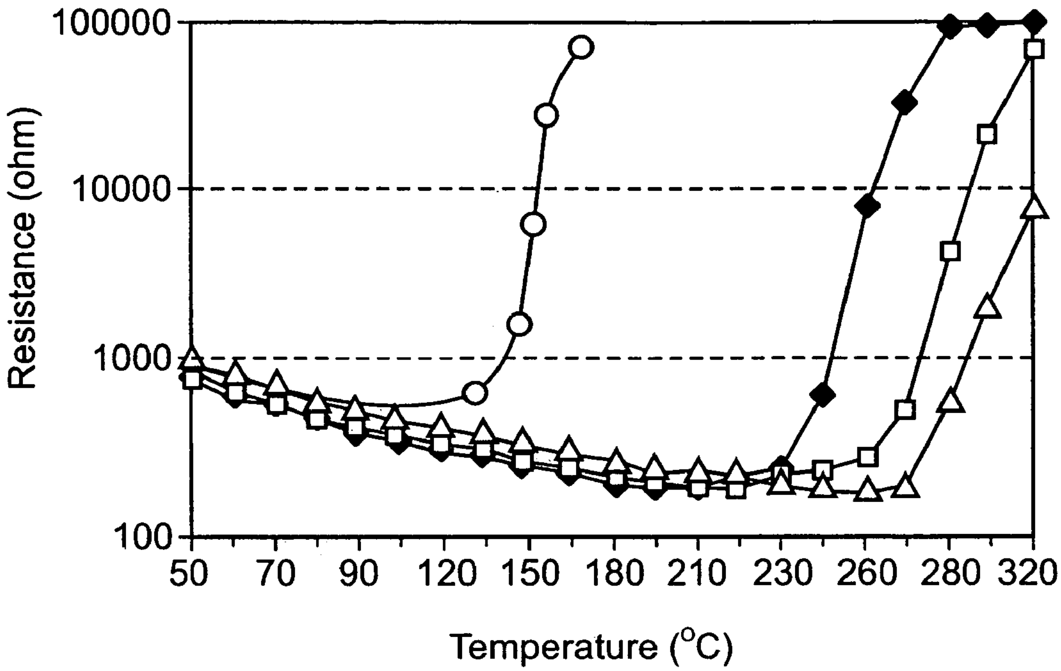
FIG. 3 is a set of curves illustrating the temperature resistance relationship of several typical PTC thermistors that may be used in the vacuum gauge of FIGS. 1 and 2.

FIG. 3 is a set of curves illustrating the temperature resistance relationship of several typical PTC thermistors, wherein it will be seen that at a predetermined temperature, depending on the composition of the thermistor, the resistance increases sharply, virtually to infinity. Accordingly, such a thermistor supplied by a constant voltage source automatically self-regulates itself without any feedback controls, so as to maintain the desired predetermined temperature (above the temperature of the gas within vacuum chamber VC). Since the temperature remains constant, the current through the thermistor varies in accordance with the thermal load on the thermistor. This thermal load in turn varies with the rate that heat of the thermistor is dissipated by the gas within vacuum chamber VC, and thereby provides a measurement of the level of the vacuum within that chamber.

The rate of heat dissipation by the vacuum does not relate linearly with respect to the level of the vacuum. Thus, for a range of the pressure from about 5 down to $10^{-3}$ mbar, heat dissipation from the hot spot is dominated by conduction through the surrounding gas; at lower vacuum levels, heat dissipation is largely effected by radiation; and above 10 mbar, in addition to conduction, heat dissipation is affected by convection, which is proportional to the pressure.

Processor 16 may utilize the measured changes in resistance of the PTC thermistor 6 to produce a measurement of the pressure within vacuum chamber VC by comparing the current output from current meter 12 with stored data correlating the measured current output to various vacuum levels for the particular gas within the vacuum chamber. Calibration resistor 14 included in the electrical circuit of FIG. 2 may be used for providing this stored calibration data.

As one example, the PTC thermistor of the leftmost curve in FIG. 2 could be used, in which case the predetermined temperature to which the thermistor would be heated would be about 130° C.–140° C. A preferred PTC thermistor that may be used is one made of barium titanate, since this material is characterized by a very high resistance to corrosion and a relatively low hazard to explosion.

Figure 4:
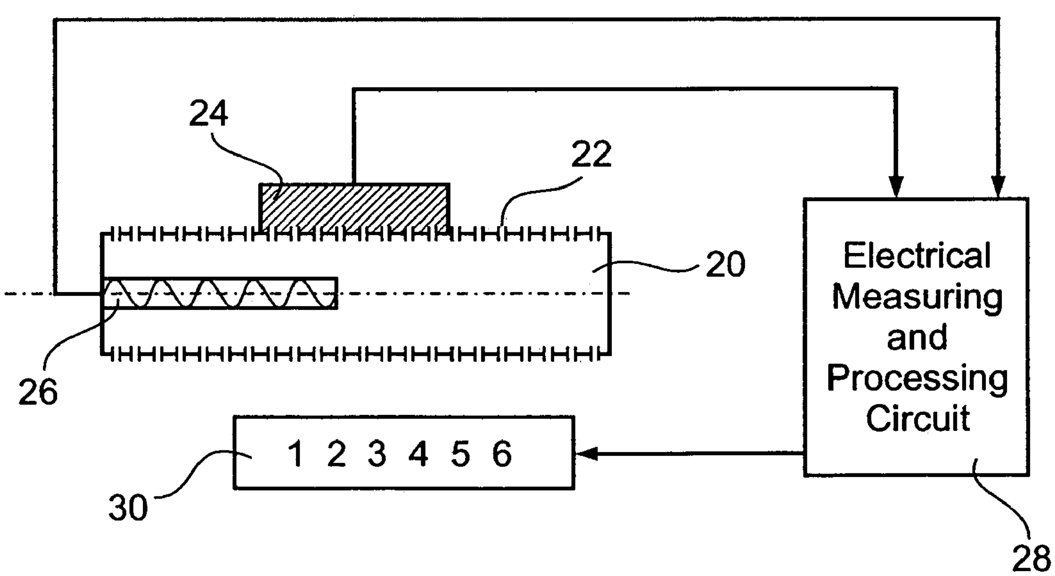
FIG. 4 illustrates apparatus constructed in accordance with the present invention for exposure to the atmosphere in order to measure the pressure thereof at the point of exposure, e.g., for use as a barometer for measuring barometric pressure, or for use as an altimeter for use in measuring altitude.

FIG. 4 illustrates apparatus constructed in accordance with the present invention to serve as a barometer for measuring atmosphere pressure, and/or as an altimeter for measuring altitude. Such an apparatus includes a housing 20 to be exposed to the atmosphere and formed with a plurality of perforations 22 such that the interior of the housing is also exposed to the atmosphere. A PTC thermistor 24 is mounted to an external face of housing 20 to serve as a heater for heating the housing, including its interior, to a predetermined temperature. Another PTC thermistor 26 is mounted within the housing to serve as a sensor for sensing the rate of heat dissipation of the gas within the housing. As described above, the rate of heat dissipation with respect to PTC sensor 26 varies with the density, and thereby with the pressure, of the gas within the housing, and therefore serves as a measure of the pressure within the housing.

The apparatus illustrated in FIG. 4 further includes an electrical circuit, generally designated by block 28, corresponding to the electrical circuit illustrated in FIG. 2, including processor 16, for processing the output of PTC sensor 26 to produce a measurement of the pressure within housing 20, which measurement is displayed in digital readout 30.

Where the apparatus illustrated in FIG. 4 is to be used for producing a measurement of the barometric pressure, electrical circuit 28, particularly its processor (corresponding to processor 16, FIG. 2), would be programmed for this purpose. On the other hand, if the apparatus illustrated in FIG. 4 is to be used as an altimeter, to produce a measurement of altitude, the processor would be programmed for this purpose.

Figure 5:
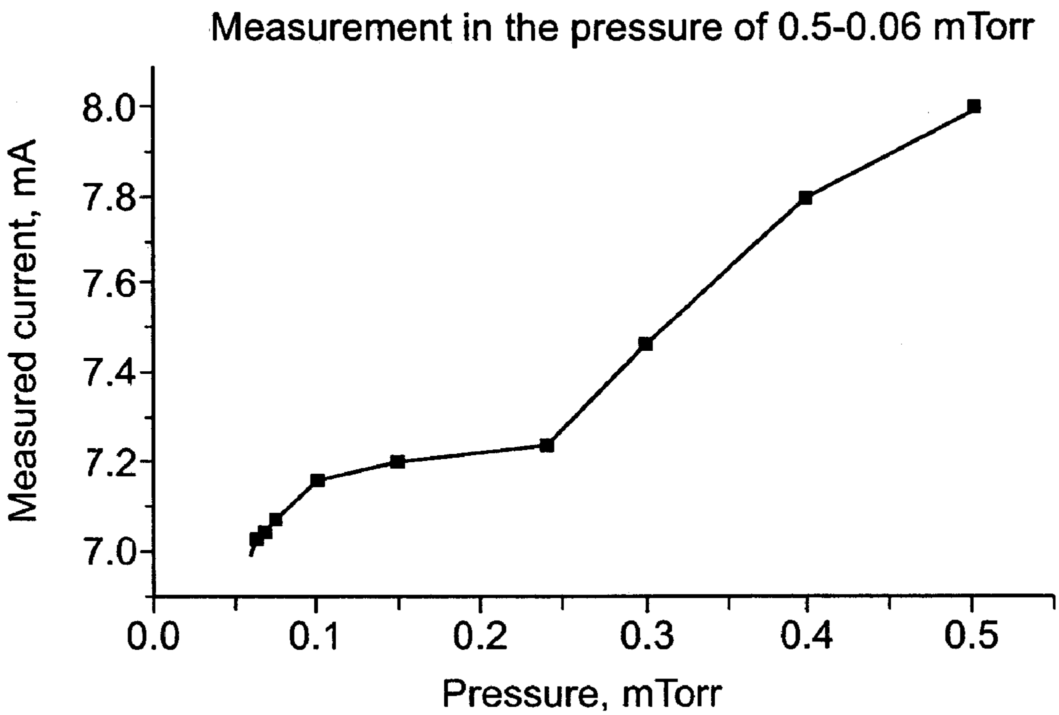
FIG. 5 illustrates measurement results using the described gauge for measuring pressures within the range of 0.5–0.06 mTorr.
Figure 6:
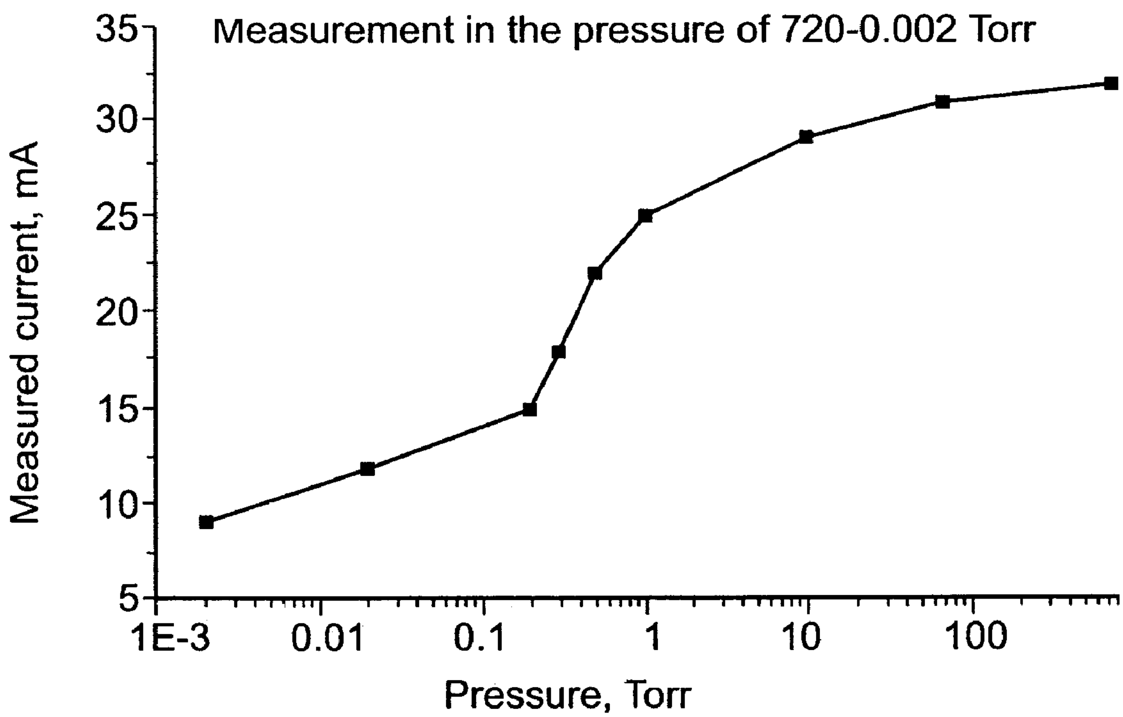
FIG. 6 illustrates measurement results using the described gauge for measuring pressures within the range of 720–0.002 Torr.

FIG. 5 is a curve of test data illustrating the variation in the measured current from current meter 12 for various pressures within the range of 0.5–0.06 mTorr. FIG. 6 is a curve of other test data illustrating the variation of measured current with pressure within the range of 720–0.002 Torr.

Figure 7:
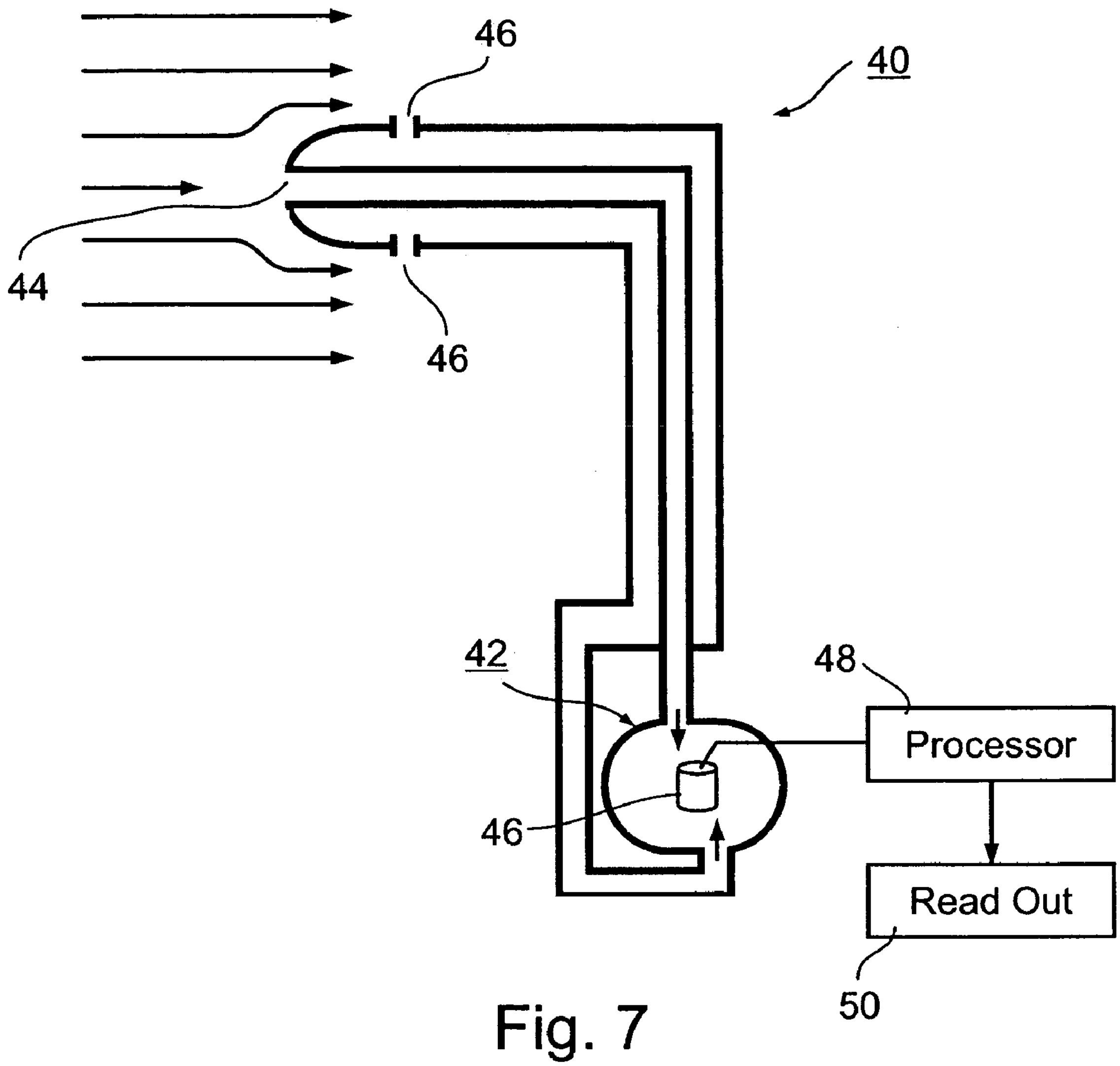
FIG. 7 illustrates the invention implemented in a pitot tube type apparatus for measuring the speed of a body through a fluid, such as the speed of an aircraft through the air.

FIG. 7 illustrates the invention implemented in a pitot tube type speedometer to be carried by a body moving through a fluid medium, such that the produced measurement is the velocity of movement of the body through the fluid medium. As indicated earlier, such pitot tube gauges are commonly used in aircraft, and sometimes in sea-craft, for measuring velocity.

Thus, the apparatus illustrated in FIG. 7 includes a conventional pitot tube, generally designated 40, connected to a differential chamber 42 so as to produce therein a differential pressure corresponding to the difference between the total pressure sensed at a stagnation point 44, and the static pressure sensed at static taps 46. As known in pitot tube gauges, the measured differential pressure within chamber 42 can be used for producing a measurement of the velocity of the object (e.g., aircraft) carrying the pitot tube and gauge moving through a fluid, such as air or water.

According to the present invention, the differential pressure within chamber 42 is measured by a PTC thermistor 46, mounted within chamber 42, and serving as a sensor for sensing the rate of heat dissipation therefrom attributable to the gas within the chamber. Since the rate of heat dissipation varies with the pressure within the chamber, as described above, such a measurement corresponds to the pressure level within the chamber.

The output of PTC thermistor 46 is fed to an electrical measuring and processing circuit 48 which would be programmed to convert the measured pressure within chamber 42 to the velocity of movement of the aircraft, or other body carrying the pitot tube gauge. Such output is displayed in read out 50.

Figure 8:
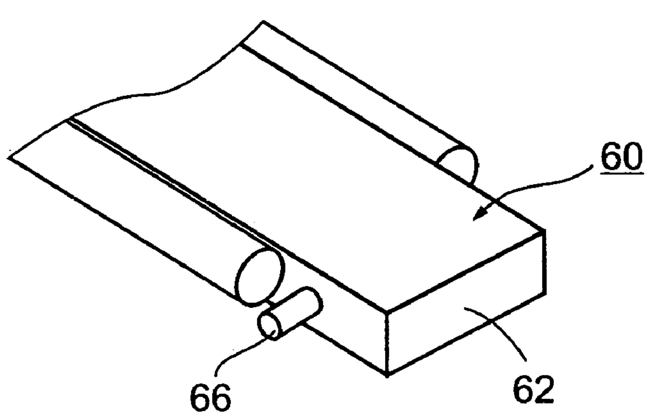
FIG. 8 illustrates the invention implemented in a leak detector, particularly in a helicopter blade formed with a compartment initially filled with nitrogen gas in order to detect cracks in the helicopter blade.

FIG. 8 illustrates a further application of the invention, namely for detecting a leak in a structure. In the example illustrated in FIG. 9, the structure is a helicopter blade, and the purpose of detecting a leak therein is to provide an early detection of any crack in the blade.

Thus, FIG. 8 illustrates a fragment of a helicopter blade, generally designated 60, formed with a compartment therein which is initially filled with a gas of known pressure. Also disposed within compartment 62 is a positive temperature coefficient (PTC) thermistor 66 effective to continuously monitor the pressure of the gas within compartment 62 in the manner described above, such that any significant drop in pressure would indicate a leakage from the compartment, and thereby a crack in the helicopter blade.

As one example, compartment 62 of helicopter blade 60 may be filled with nitrogen gas at a predetermined pressure. Any drop in the pressure would thus indicate a leakage from the compartment, and thereby a crack in the helicopter blade.

While the invention has been described with respect to several preferred embodiments, it will be appreciated that these are set forth merely for purposes of example, and that many other variations, modifications and applications of the invention may be made.

What is claimed is:

1. A method of measuring the pressure of a fluid medium, comprising:

immersing within the fluid medium an electrical resistor having a resistance varying with temperature;

applying electrical current through the electrical resistor to heat it to a predetermined temperature above that of said fluid medium; and measuring the rate of change in resistance of said electrical resistor to produce a measurement of the rate of thermal heat dissipation, varying with the density of the fluid medium in which the electrical resistor is immersed, and thereby a measurement of the pressure of said fluid medium;

wherein said electrical resistor is a positive temperature coefficient thermistor driven by a constant voltage source and having a resistance which increases sharply at said predetermined temperature, such that the thermistor is automatically self-controlled to substantially maintain said predetermined temperature, whereby the electrical current drawn by said thermistor is a measurement of the thermal load on the thermistor resulting from the thermal heat dissipation therefrom, and thereby a measurement of the pressure of the fluid medium.

2. The method according to claim 1, wherein said positive temperature coefficient thermistor is immersed in a medium under vacuum such that the produced measurement is the level of said vacuum.

3. The method according to claim 1, wherein said positive temperature coefficient thermistor is immersed in a pressurized fluid medium such that the produced measurement is the pressure of said fluid medium.

4. The method according to claim 3, wherein said pressurized fluid medium is a gas.

5. The method according to claim 1, wherein said positive temperature coefficient thermistor is exposed to the atmosphere such that the produced measurement is the barometric pressure.

6. The method according to claim 1, wherein said positive temperature coefficient thermistor is carried by a body exposed to the atmosphere such that the produced measurement is the altitude of the body carrying the positive temperature coefficient thermistor.

7. The method according to claim 1, wherein said positive temperature coefficient thermistor is included in a pitot tube carried by a body moving through said fluid medium such that the produced measurement is the velocity of movement of said body through said fluid medium.

8. The method according to claim 1, wherein said positive temperature coefficient thermistor is included in a compartment initially filled with a gas of known pressure in order to detect leakage of said gas from said compartment.

9. The method according to claim 8, wherein said compartment is initially filled with nitrogen gas.

10. The method according to claim 8, wherein said compartment is within a helicopter blade in order to detect formation of a crack in said helicopter blade.

11. Apparatus for measuring the pressure of a fluid medium, comprising:

an electrical resistor having a resistance varying with temperature to be immersed in the fluid medium;

a power supply for supplying said electrical resistor with electrical current to heat it to a predetermined temperature above that of the fluid medium; and a processor for measuring the change in resistance of said electrical resistor to produce a measurement of the rate of thermal heat dissipation of the fluid medium in which the electrical resistor is immersed, and thereby a measurement of the pressure of said fluid medium;

wherein said electrical resistor is a positive temperature coefficient thermistor driven by a constant voltage from said power supply and having a resistance which increases sharply at said predetermined temperature at which it is maintained by said constant voltage, such that the thermistor is automatically self-controlled to substantially maintain said predetermined temperature; and wherein said processor utilizes the measured changes in resistance of said positive temperature coefficient thermistor to produce a measurement of the pressure of said fluid medium.

12. The apparatus according to claim 11, wherein said apparatus is a vacuum gauge in which said positive temperature coefficient thermistor is to be immersed in a medium under vacuum; and wherein said processor utilizes the measured changes in resistance of said positive temperature coefficient thermistor to produce a measurement of the level of the vacuum.

13. The apparatus according to claim 11, wherein said apparatus is a pressure gauge in which said positive temperature coefficient thermistor is to be immersed in a pressurized fluid medium; and wherein said processor utilizes the measured changes in resistance of the positive temperature coefficient thermistor to produce a measurement of the pressure of said fluid medium.

14. The apparatus according to claim 11, wherein said apparatus is a barometer in which said positive temperature coefficient thermistor is to be exposed to the atmosphere; and wherein said processor utilizes the measured changes in resistance of said positive temperature coefficient thermistor to produce a measurement of the barometric pressure.

15. The apparatus according to claim 11, wherein said apparatus is an altimeter in which said positive temperature coefficient thermistor is to be exposed to the atmosphere at a level above sea level; and wherein said processor utilizes the measured changes in resistance of said positive temperature coefficient thermistor to produce a measurement of altitude.

16. The apparatus according to claim 11, wherein said positive temperature coefficient thermistor is included in a pitot tube carried by a body moving through said fluid medium; and wherein said processor utilizes the measured changes in resistance of said positive temperature coefficient thermistor to produce a measurement of the velocity of movement of the body through said fluid medium.

17. The apparatus according to claim 11, wherein said positive temperature coefficient thermistor is included in a compartment initially filled with a gas of known pressure; and wherein said processor utilizes the measured changes in resistance of said positive temperature coefficient thermistor to detect leakage of gas from said compartment.

18. The apparatus according to claim 17, wherein said compartment is initially filled with nitrogen gas.

19. The apparatus according to claim 17, wherein said compartment is within a helicopter blade in order to detect formation of a crack in said helicopter blade.

20. The apparatus according to claim 11, wherein said positive temperature coefficient thermistor is a barium titanate thermistor.

* * * * *